(12) United States Patent
Popescu et al.

(10) Patent No.: US 9,105,008 B2
(45) Date of Patent: Aug. 11, 2015

(54) DETECTING CONTROVERSIAL EVENTS

(75) Inventors: Ana-Maria Popescu, Mountain View, CA (US); Marco Pennacchiotti, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 683 days.

(21) Appl. No.: 12/955,007

(22) Filed: Nov. 29, 2010

(65) Prior Publication Data

US 2012/0136985 A1    May 31, 2012

(51) Int. Cl.
*G06F 15/173* (2006.01)
*G06Q 10/10* (2012.01)
*G06Q 50/00* (2012.01)

(52) U.S. Cl.
CPC ............... *G06Q 10/10* (2013.01); *G06Q 50/01* (2013.01)

(58) Field of Classification Search
USPC .................................. 709/203, 202, 223, 224
See application file for complete search history.

(56) References Cited

U.S. PATENT DOCUMENTS

| | | | |
|---|---|---|---|
| 2007/0244793 A1* | 10/2007 | Boesel | 705/37 |
| 2008/0086534 A1* | 4/2008 | Bardak et al. | 709/206 |
| 2008/0215426 A1* | 9/2008 | Guldimann et al. | 705/14 |
| 2009/0287687 A1* | 11/2009 | Martire et al. | 707/5 |
| 2010/0042364 A1* | 2/2010 | Nakamura et al. | 702/179 |
| 2010/0088322 A1* | 4/2010 | Chowdhury et al. | 707/751 |
| 2010/0191742 A1* | 7/2010 | Stefik et al. | 707/748 |
| 2010/0312619 A1* | 12/2010 | Ala-Pietila et al. | 705/14.1 |

OTHER PUBLICATIONS

E. Brill, "Transformation-Based Error-Driven Learning Language Processing: A Case Study in Part-of-Speech Tagging", The John Hopkins University, *Computational Linguistics*, 21: pp. 543-565, 1995.

Chen, C. et al., "Visual Analysis of Conflicting Opinions.", *IEE Symposium on Visual Analytics Science and Technology*, pp. 59-66, 2006.

Choudhury, M. et al., Multi-Scale Characterization of Social Network Dynamics in the Blogosphere. In *CIKM*, pp. 1515-1516, 2008.

Friedman, J.H. Greedy Function Approximation: A Gradient Boosting Machine. *Annuals of Statistics*, 29 (5): pp. 1189-1232, Feb. 24, 1999.

Friedman, J.H. "Recent Advances in Predictive (Machine) Learning", Stanford University, Journal of Classification, 23 (2): pp. 175-197, 2006.

(Continued)

*Primary Examiner* — Lan-Dai T Truong
(74) *Attorney, Agent, or Firm* — Hickman Palermo Becker Bingham LLP

(57) ABSTRACT

A method, device, and computer-readable storage medium storing instructions are provided for detecting controversial events that are reflected in user-generated content items. In a single-step approach, user-generated content items are received and analyzed by a controversial event detection module, which determines the likelihood that sets of content items reflect controversial events. In one example, public posts by users of a social networking service are grouped into snapshots of posts that are associated with an entity and were generated during a window of time. An event detection module may determine the likelihood that snapshots reflect events. In a two-step approach, event snapshots are provided to a controversy detection module, which determines the likelihood that event snapshots are controversial. In a blended approach, snapshots are provided to a controversy detection module, which determines the likelihood that snapshots are controversial events based in part on the event score.

24 Claims, 7 Drawing Sheets

(56) References Cited

OTHER PUBLICATIONS

Green D. et al., "Signal Detection Theory and Psychophysics", Columba University, New York, 1966, 6 pages.

Kim, Soo-Min, et al., "Extracting Opinions, Opinion Holders, and Topics Expressed in Online News Media Text", USC Information Science Institute, *Proceedings of the Workshop on Sentiment and Subjectivity in Text*, ACL, 8 pages.

Lu Bin, "Identifying Opinion Holders and Targets with Dependency Parser in Chinese New Texts", In *Proceedings of ACL*, Jun. 2010, 6 pages.

Mishne G. et al., "Leave a Reply: An Analysis of Weblog Comments", *Third Annual Workshop on the Weblogging Ecosystem*, WWW, 2006, 8 pages.

Popescu, Ana-Maria et al., "Extracting Product Features and Opinions from Reviews", Department of Computer Science and Engineering, University of Washington, *Proceedings of HLT/EMNLP-2005*, pp. 339-346, 2005.

Sayyadi, Hassan et al., "Event Detection and Tracking in Social Streams", *Proceedings of ICWSM*, 4 pages, 2009.

Turney P. et al., "Thumbs Up or Down? Semantic Orientation Applied to Unsupervised Classification of Reviews", *Proceedings of ACL.*, Jul. 2002, 417-424 pages.

Varlamis I. et al. "Monitoring the Evolution of Interests in the Blogosphere", Computer Sciences Department, Athens University of Economics and Business, *ICDE Workshops*, 2008, pp. 513-518.

Wiebe J. et al., "Annotating Expressions of Opinions and Emotions in Language" *Language Resources and Evaluation*, 54 pages, 2005.

Wiebe J. et al., Creating Subjective and Objective Sentence Classifiers from Unannotated Texts, *In CICLING*, pp. 475-786, 2005.

Wilson, T et al., "Recognizing Contextual polarity in Phrase-Level Sentiment Analysis" *In Computational Linguistics*, 6 pages, 2009.

Wilson T. et al., "Just How Mad Are You? Finding Strong and Weak Opinion Clauses" *In proceedings of $9^{th}$ AAAI*, 7 pages, 2004.

Hu. Yu et al., "Towards Answering Opinion Questions Separating Facts from Opinions and Identifying the polarity of Opinion Sentences", *Proceedings EMNLP*, pp. 129-136, 2003.

Yunfang, Wu et al., "SemEval-2010 Task 18: Disambiguating Sentiment Ambiguous Adjectives" *In proceedings of SemEval, ACL 2010*. Association for Computational Linguistics, Jul. 2010 5 pages.

Zhao, Q. et al., "Event Detection and Visualization for Social Text Streams" *In proceedings of the ICWSM*, 4 pages, 2007.

Zhao, Q. et al., "Temporal and Information Flow Based Event Detection From Social Text Streams", *In proceedings of the WWW*, 6 pages, 2007.

Tsytsarau, M. et al., "Scalable Discovery of Contradictions on the Web", *In Proceedings of WWW*, 2 pages Apr. 2010.

\* cited by examiner

DETECTING CONTROVERSIAL EVENTS

RELATED APPLICATIONS

The present application is related to U.S. patent application Ser. No. 12/909,766, entitled Matching Items Of User-Generated Content To Entities, filed on Oct. 21, 2010, the entire contents of which are incorporated herein by reference.

FIELD OF THE INVENTION

The present invention relates to detecting controversial events from a set of content items.

BACKGROUND

Various social networking applications allow users to generate and share content with each other from almost anywhere. For example, Twitter® allows users to provide minute-by-minute status updates by sending text messages from a cell phone, accessing a Web site from a personal computer, or using an application from a smart phone such as an iPhone® or an Android® phone. Facebook®, Myspace®, and LinkedIn® similarly allow users to update their status and otherwise share content with their friends, with groups of friends, or with the general public. Foursquare® and Gowalla® allow users to check into a specified location as a form of status update.

Because these applications are free and readily available, users tend to frequently post short items of content, often less than 160 characters. Much of the content includes slang terms, acronyms, and/or incomplete phrases. Social networking applications allow an author to freely post this ambiguous content in the social networking context. The posts generally reach friends of the author and subscribers of the author's posts. The readers sometimes understand the content, but the content is not always understood by or even relevant to the readers. The posts often do not reach the readers to whom the content could be the most interesting.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
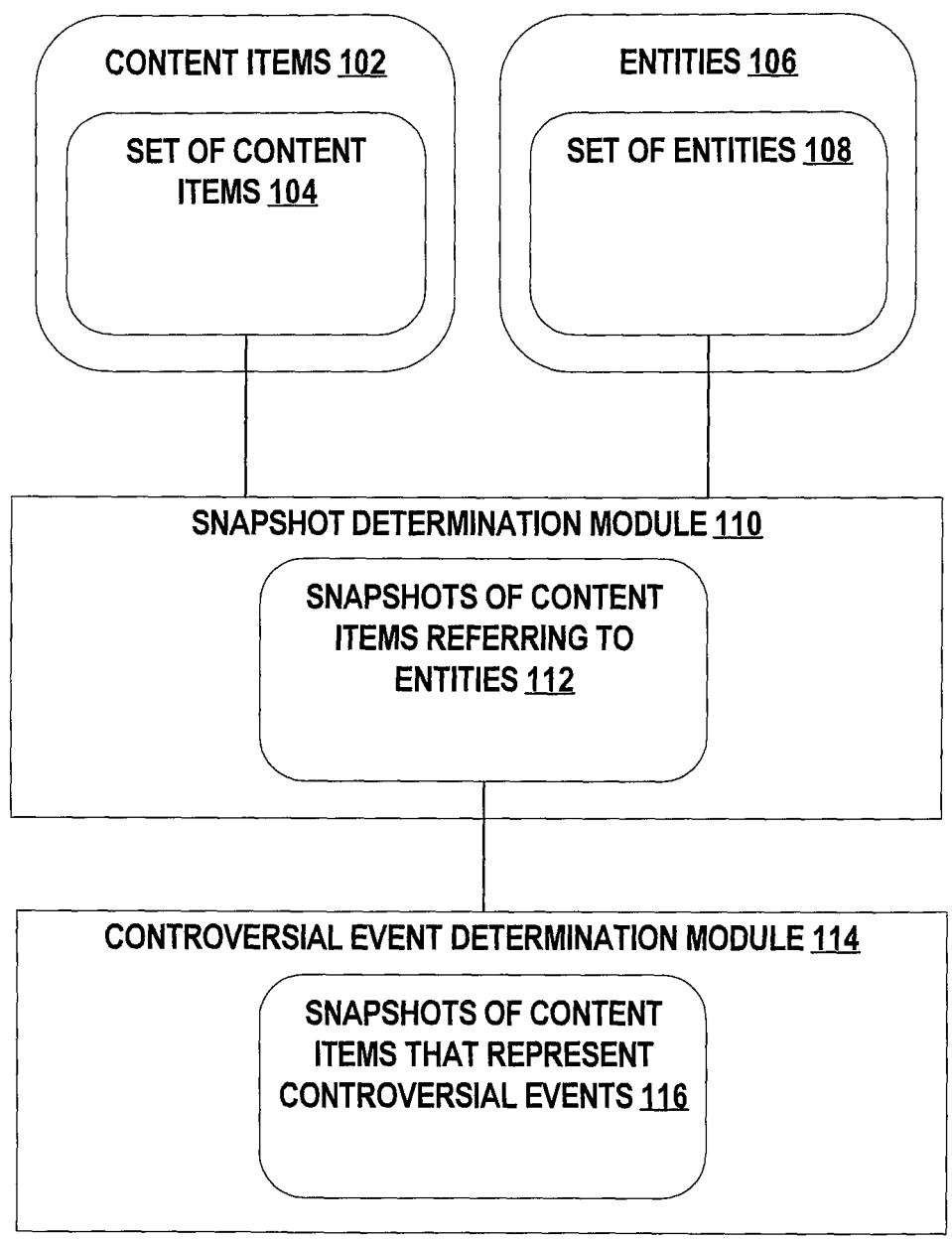
FIG. 1 is a diagram illustrating an example system for detecting controversial events from a set of content items.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, device, and computer-readable storage medium storing instructions are provided for detecting controversial events that are reflected in user-generated content items. In a single-step approach, user-generated content items are received and analyzed by a controversial event detection module, which determines the likelihood that sets of content items reflect controversial events. In one example, public posts by users of a social networking service are grouped into snapshots of posts that are associated with an entity and were generated during a window of time. An event detection module may determine the likelihood that snapshots reflect events. In a two-step approach, event snapshots are provided to a controversy detection module, which determines the likelihood that event snapshots are controversial. In a blended approach, snapshots are provided to a controversy detection module, which determines the likelihood that snapshots are controversial events based in part on the event score.

In one embodiment, a process of selecting snapshots that reflect controversial events includes determining a "buzziness" of discussions about entities. A discussion about an entity is "buzzy" if the entity is being discussed or mentioned more frequently than the entity is typically discussed or mentioned. In one example, the buzziness of an entity over a window of time accounts for a number of references to the entity in a snapshot of content items for that window of time. The number of references to the entity in the snapshot may be compared to an expected number of references to the entity. The expected number of references to the entity may be determined from other snapshots of items that refer to the entity and were generated during other windows of time.

In one embodiment, a process of selecting snapshots that reflect controversial events includes determining a buzziness of entities in other content sources that reported on the entities during a window of time. In one example, the buzziness of an entity over the window of time accounts for a number of references to the entity by the other content sources during that window of time. The number of references to the entity by the other content sources may be compared to an expected number of references to the entity by the other content sources. The expected number of references to the entity may be determined from references to the entity by the other content sources during other windows of time.

In one embodiment, the items of user-generated content include posts by users of a social networking service. Some social networking applications restrict the posts to less than 160 characters in length. The references to the entity by other content sources may include references in articles that are more than 160 characters in length from a reporting service that reports a plurality of articles. For example, the articles may be published in an electronic magazine, journal, newspaper, or other reputable content source.

A content source may be considered as reputable if it is periodically published, if the content source is subscription-based or supported by advertisements, if the content source has a plurality of authors reporting on facts of first-hand knowledge, if articles from the content source are reviewed by human editors according to a set of rules before the articles are posted, if human editors verify facts of the articles before the articles are posted, if the author(s) writing or approving the articles are bound by professional rules to produce factual works, and/or if the content source is highly regarded as being reputable in a professional community. In another embodiment, a content source may be considered as reputable if an administrator of the techniques described herein has chosen to trust content from the content source as factual.

In one embodiment, a process of selecting snapshots that reflect controversial events includes determining whether items in the snapshots refer to other entities. For example, if items in the snapshot refer to another entity with a high controversy score, then the controversy score for the snapshot may be increased. Similarly, if the other entity has a low controversy score, then the controversy score for the snapshot may be decreased.

Various other features may also affect the determination of whether a snapshot of items reflects a controversial event. For example, the determination may account for controversial terms appearing in the content, positive and/or negative sentiments appearing in the content, questions appearing in the content, unique marked tags appearing in the content, and/or verbs appearing in the content. In a specific example, the determination of whether a snapshot reflects a controversial event involving an entity is based on a number of verbs in the snapshot for which the entity is a subject or an object.

Entities

Entities, as described herein, are specified items in a set of entities. In one example, a person implementing the techniques described herein defines a set of entities. In another example, the set of entities are gathered from one or more electronic sources of entities. In one embodiment, entities are associated with attributes that may include, but are not required to include and are not limited to: a name, nickname, or other identifier of the entity, a physical location of the entity, a category of the entity, word(s) or phrase(s) associated with the entity, user(s) associated with the entity, or other entities associated with the entity. Example entities include, but are not limited to, celebrities, actors, musicians, politicians, public officials, athletes, scholars, businesses, and organizations. In one embodiment, entities are included in a set of entities based on how frequently the entities have been discussed in the past, and the set of entities is used for analyzing content items and generating entity snapshots.

In one embodiment, entities are real-world entities that have been associated with past events. Events include activities or actions with a clear starting point, a clear ending point, and/or a clear duration in which an entity plays a role. In another embodiment, entities are reference entries in a reference source that provides a description of or attributes of a plurality of reference entries.

In one embodiment, the reference source is an online dictionary or encyclopedia. In one example, the encyclopedia entries are created and modified by users. Wikipedia® is one well-known encyclopedia with reference entries that are created and modified by users. Wikipedia® entries may include a description of an entity, references to other entities, and categories and nicknames for the entity. Words or phrases associated with the entity may be determined based on a frequency or prominence (title versus body, typeface, etc.) of occurrence of the words in the Wikipedia® entry. In the Wikipedia® example, the attributes of a given Wikipedia® entry may be words or phrases used in the given Wikipedia® entry or in other Wikipedia® entries to refer to the given Wikipedia® entry. The attributes may also include a category of the given Wikipedia® entry, names and nicknames of the given Wikipedia® entry, and/or other Wikipedia® entries that refer to and are referred to by the given Wikipedia® entry.

In another embodiment, the entities are directory entries in a directory of businesses or people. For example, Yahoo!® Local includes directory entries of businesses. Each directory entry may include a number of attributes, such as the business name, address, phone number, email address, business category, hours of operation, menu or listing of available goods or applications, and descriptions or tags that associate the entity with words or phrases.

Content Items

Content items include any items of user-generated content such as status updates, comments, or other notes. Social networking applications are applications that connect remote users to each other by allowing the remote users to share content items with each other on a social networking interface. For example, status updates of other users may appear in a social networking user's personal display of a news feed. In one embodiment, content items are associated with timestamps that indicate when a user generated, shared, or submitted the content items. Users may provide minute-by-minute status updates by sending text messages from a cell phone, accessing a Web site from a personal computer, or using an application from a smart phone such as an iPhone® or an Android® phone. Facebook®, Myspace®, LinkedIn®, Twitter®, Foursquare®, and Gowalla® provide social networks where users can share content items with friends, acquaintances, friends of friends, group members, or the general public. Content items are often less than 160 characters and include slang terms, acronyms, and/or incomplete phrases.

Entity Snapshots

A corpus of content item may be analyzed to determine a set of content items that are matched to entities. In one embodiment, the corpus of content items is gathered from one or more social networking services, and the content items include status updates and/or other public posts by users of the social networking services. In some embodiments, the content items may be restricted in length to, for example, 160 characters.

The techniques described herein are not limited with respect to the manner for matching content items to entities. In one embodiment, a content item is matched to one or more entities based on the content of the item and optionally the content of one or more other items. For example, a content item mentioning a name of an entity may be matched to the entity. In various other examples, the content item may mention a nickname of the entity, a physical location of the entity, a category of the entity, word(s) or phrase(s) associated with the entity, user(s) associated with the entity, or other entities associated with the entity. In one embodiment, contents of two or more content items submitted by a same author are used to match one of the content items to the entity. In other words, posts from a single user may be viewed collectively in order to determine that one of the user's posts refers to an entity.

In one embodiment, a content item is matched to an entity if the likelihood that the content item refers to the entity is greater than a specified threshold. For example, a short content item may mention "Amazon" and "jungle." The content item may be 75% likely to refer to the Amazon Rainforest, 20% likely to refer to Amazon.com, and 5% likely to refer to some other "Amazon." If the threshold is 70%, then the content item is matched to the Amazon Rainforest. If the threshold is 80%, then the content item is not matched to an "Amazon" entity.

In one embodiment, content items may be matched to more than one entity. For example, a content item mentioning "Brangelina" may be unambiguously matched both to actor Brad Pitt and to actress Angelina Jolie. As another example, a content item mentioning both Obama and Biden may be unambiguously matched to President Barack Obama and/or Vice President Joe Biden. In this example, the fact that the content item mentions "Obama" makes the content item more likely to also refer to Vice President Joe Biden rather than some other entity named Biden. In yet another example, one content item from a user mentions Obama, and another content item from the user might mention "Biden." Under these circumstances, the content items are viewed collectively to match the other content item to Vice President Joe Biden. In one embodiment, if content item(s) unambiguously refer to two entities, then the item(s) may be matched to the entity that is more frequently discussed.

Sets of content items that refer to an entity are grouped into an entity snapshot for that entity only. In one embodiment, a snapshot for an entity includes only those content items that are unambiguously matched to that entity. In another embodiment, a snapshot includes information about the likelihood that content items in the snapshot refer to the entity. A set of entity snapshots is generated by matching content items to entities. In one embodiment, snapshots are associated with a particular window of time, such as a number of seconds, minutes, hours, days, or weeks. In one example, a snapshot of an entity over the past week includes posts by users about the entity during the past week. Other snapshots of the entity may cover other one-week spans, such as previous weeks. In one embodiment, the snapshots cover different entities during the same window of time. For example, a Brad Pitt snapshot may cover posts by users about Brad Pitt over the past day, and an Angeline Jolie snapshot may cover posts by users about Angelina Jolie over the past day.

Event Detection

An event is an activity or action in which one or more entities are involved. For example, an entity may be an actor performing the action, an object of the action, or otherwise associated with the activity or action. In another embodiment, entities include venues or organizations. In one embodiment, an event falls within a defined time window, has a clear duration, a clear starting time, and/or a clear ending time. An arrest and trial of a celebrity is one example of an event, where the starting time may be the day or week the celebrity was arrested, and the ending time may be the day or week the celebrity was convicted or acquitted. In one embodiment, an event may be a collection of sub-events. For example, the World Series includes between 4 and 7 games, and most of the status updates about the World Series are likely to occur just before, during, or near the end of each of the games. Events are detected automatically by monitoring the level of discussion about the entities associated with the events.

In one embodiment, snapshots of entities are collected periodically. If an entity snapshot for a given time window includes more references to the entity than entity snapshots for other time windows, then the entity is being discussed more frequently during the given time window. A level of discussion of the entity during the given time window, or the "buzziness" of the entity, is one indication that there is an event associated with the entity during that time window. In other words, an entity snapshot with a high degree of buzziness is more likely to reflect an event associated with the entity. In one example, a number of mentions of the entity in a given time window is compared to an average number of mentions of the entity in other time windows. As used herein, the "average" may be determined using any now known or later developed averaging algorithm. Non-limiting example averaging algorithms include a mean number of mentions, a median number of mentions, or a mode number of mentions.

An entity snapshot may also be categorized as an event if content items in the snapshot reference known events. For example, an item mentioning "Lincecum" may also mention "World Series." Although the mention of "Lincecum" may place the item into an entity snapshot for "Tim Lincecum," the item itself might not indicate an event related to "Lincecum" without more. In the example, the additional mention of "World Series" associates "Lincecum" with a known event, the World Series of 2010. One or multiple mentions of the World Series in content items associated with Tim Lincecum may be sufficient to categorize a snapshot of the content items as an event such as "Tim Lincecum starts Game 1 of the World Series."

In one embodiment, a topic that is discussed among multiple authors is considered more likely to be an event. For example, if one author replies to another author about a topic, then the topic is more likely to reflect an event. Lengthy threads of replies among multiple authors are more likely to reflect events than are short threads of replies among fewer authors.

Various other factors may also be included in a determination of an event score. An event score indicates a degree to which a snapshot of content items is likely to reflect an event associated with one or more entities. In one embodiment, the event score is based at least in part on the content of the items in the snapshot. For example, the event score may account for a number or type of hashtags and/or keywords in the snapshot. A hashtag is a user-specified context for the content item that is set apart from the remainder of the content by a marker such as "#" or "–". A snapshot including hashtags that are frequently associated with events may be assigned a higher event score than a snapshot not including hashtags or a snapshot including hashtags that are frequently associated with non-events. An example hashtag that may increase the event score is "#news," such as in the content item "#news Giants win Game 1". An example hashtag that may decrease the event score is "#review," such as in "#review The Sound of Music was okay."

Similarly, certain keywords in the content items may provide a context that increases or decreases the event score. Keywords like "review," "rented," or "Netflix" may decrease the event score. In contrast, keywords like "trial," "win," "lose," or "today" may increase the event score. In one embodiment, a machine computes the event score using an event lexicon that includes stored keywords that are likely to reflect events.

In one embodiment, the event score is based on a number of items in the set that contain a verb for which the entity is a subject and/or an object. The process includes determining the number of items that contain a verb for which the entity is a subject and/or an object. In one example, a dictionary of verbs is used to detect verbs in the content items. A grammatical structure of the content item, as well as a tense of the verb, may be used to determine whether a reference to an entity is a subject or an object of the verb. For example, for the item, "Lincecum wins," the entity Tim Lincecum is a subject or actor performing the action of winning. When the entity is a subject, adverbs such as "finally" or "convincingly" may be used between the entity and the verb. In another example, "Cy Young awarded to Lincecum," Tim Lincecum is an object of the action of awarding. When the entity is an object, prepositions such as "to," "for," and "at" may be used between the verb and the reference to the entity.

Other features that may contribute to the event score include, but are not limited to: linguistic features including nouns, verbs, keywords, and/or questions in the content items; structural features including hashtags in the content items, whether content items are replies or copies of other content items, and information about users or entities that are associated with the content items; buzziness features including the relative frequency that an entity is mentioned in a given time window versus other time windows; sentiment including positive, negative, or neutral terms in the content items; controversy including frequency of positive and negative content items, frequency of event-indicative hashtags; news buzz features including the number of articles from other sources related to the same entity and generated during the same time window as the content items; and any other features relevant to whether content items reflect events, such as features that can be gleaned from content in the content items, from information about the author who submitted the content items, and/or from information in other sources related to the same entity and generated during the same time window as the content items. The event score may also account for other example features that are provided in Table 2.

Features of a snapshot over a given time period may be compared to or provided relative to features of other snapshots for the same entity in other time periods. For example, an event score may be higher or lower if features occur more or less frequently than average for snapshots associated with the same entity.

In one example from Table 1 below, content items referring to Barack Obama are categorized as events, and one set of content items referring to Sigourney Weaver is categorized as an event while another set of content items referring to Sigourney Weaver is categorized as a non-event. Specifically, the first set is categorized as a non-controversial event, and the second set is categorized as a non-event. In the example, the event has been explicitly defined in terms of the entity, but the event need not be explicitly defined in order to determine an event score.

TABLE 1

| ENTITY | TIME PERIOD | EXAMPLE TWEETS | EVENT |
|---|---|---|---|
| Barack Obama | Sep. 10, 2009 | "barack obama wins the Nobel peace prize" ":O For what???? RT @ndtv: barack obama wins the Nobel" "congratulations to all my US friends for the nobel peace award to your president barack obama" "barack obama wins nobel peace prize. Powerful can buy anything" "barack obama just won the 2009 nobel peace prize! so awesome!" | President Barack Obama wins the Nobel Prize (controversial event) |
| Sigourney Weaver | Mar. 7, 2010 | "sigourney weaver looks fabulous #oscars" "sigourney weaver is a godess #oscars" "sigourney weaver. so fascinating. i adore you¡3" | Attending the Academy Awards ceremony (non-controversial event) |
| Sigourney Weaver | Oct. 7, 2009 | "@dwadeofficial denzel sigourney weaver" "1. denzel washington 2. sigourney weaver 3. arnold governator schwarzeneggar" "@dwadeofficial Arnold sigourney weaver and Jennifer Beals son" | (non-event) |

In one embodiment, a machine-learning model is trained on content items to determine an event score that is used to categorize snapshots as events or non-events. In one embodiment, a supervised learning or semi-supervised learning model uses snapshots that have been labeled as either events or non-events to determine whether other snapshots are events or non-events. For example, groups of content items or individual content items may be labeled by human reviewers to produce training data that includes labeled content items. The machine-learning model may then use the features of the labeled content items to automatically learn labels for unlabeled content items with similar features.

The techniques described herein are not limited with respect to the type of machine-learning mechanism that is used to learn how the input features affect the degree to which a snapshot is likely to reflect an event associated with an entity. In one embodiment, the machine-learning model assigns weights to features that reflect the degree to which the features affect how likely a snapshot of items is to reflect an event. In a decision tree learning approach, a decision tree is constructed based on labeled content items, and the decision tree is used to predict labels for the unlabeled content items. In a neural network approach, a complex mathematical model of inputs, processing algorithms, and outputs is constructed based on labeled content items, and the complex mathematical model is used to predict labels for the unlabeled content items.

In one embodiment, the event machine-learning model outputs an event score, and the event score is used to filter out non-events. In another embodiment, the event score is used as an input to a controversial event learning model. In yet another embodiment, the event machine-learning model is part of a controversial event machine-learning model, and the controversial event machine-learning model outputs a controversial event score that indicates a degree to which the snapshots of content items are likely to reflect controversial events.

In one embodiment, whether or not machine-learning is used, events are detected using a specified function that computes an event score based on input features.

Controversy Detection

A topic is controversial when content about the topic is likely to provoke disagreement or uneasiness among authors or viewers of the content. Authors or viewers of controversial content are likely to express or hold strong opinions or concerns. In one embodiment, a controversy score is determined for snapshots of content items based on content within the items, based on information about authors submitting the items, and/or based on information from other sources that discuss entities associated with the content items. The controversy score may be used to determine which events are of interest to other viewers and/or authors of content. Content items and other content about the controversial events may be displayed on an interface such as a Web site to viewers in order to provoke discussion of the controversial event and interest in the Web site. The Web site may be dedicated to providing information about hot topics. For example, Yahoo! omg! is a site that provides the latest information about celebrities.

Various factors may be included in a determination of a controversy score. A controversy score indicates a degree to which a snapshot of content items is likely to reflect a controversy associated with one or more entities. In one embodiment, the controversy score is based at least in part on the content of the items in the snapshot. For example, the event score may account for a number or type of hashtags and/or keywords in the snapshot. A snapshot including hashtags that are frequently associated with controversies may be assigned a higher controversy score than a snapshot not including hashtags or a snapshot including hashtags that are frequently associated with non-controversies. Example hashtags that may increase the controversy score are "#controv," "#scandal," "#unheard," and "#wtf." An example hashtag that may decrease the controversy score is "#agree." In another example, the number of unique hashtags in an entity snapshot may indicate that authors disagree with how to characterize an event related to the entity.

Similarly, certain keywords in the content items may provide a context that increases or decreases the controversy score. Keywords like "okay" or "average" may decrease the controversy score. In contrast, other keywords such as "disagree," "no way," and "wrong" may increase the controversy score. Also, keywords that reflect positive and negative sentiments, like "awesome," "suck," "sweet," or "awful" may increase the controversy score. In another example, high numbers of content items with positive sentiments as well as high numbers of content items with negative sentiments may indicate that content in the entity snapshot is controversial.

In one embodiment, a topic that is discussed among multiple authors is considered more likely to be controversial. For example, if one author replies to another author about a topic, then the topic is more likely to be controversial. Lengthy threads of replies among multiple authors are more likely to reflect a controversial topic than short threads of replies among fewer authors.

In one embodiment, a machine computes the controversy score using a sentiment lexicon that includes a set of stored keywords that are likely to reflect positive or negative sentiment, and/or a controversy lexicon that includes a set of stored keywords that are likely to reflect controversy. In one embodiment, the sentiment lexicon is created and updated based on user reviews of items such as restaurants, movies, or products. Keywords frequently associated with high-rating reviews reflect positive sentiment, and keywords frequently associated with low-rating reviews reflect negative sentiment. In another embodiment, OpinionFinder may be used to determine the polarity of sentiment for a set of content items. OpinionFinder is a system that identifies subjective sentences in documents based on features that are learned to be associated with subjective or objective sentences. The keyword lexicon may be used in addition to OpinionFinder to determine an overall polarity of sentiment score.

In one embodiment, the controversy lexicon is based on a controversial topic list for a source of content such as an encyclopedia, dictionary, magazine, or journal. For example, Wikipedia® maintains a controversial topic list of controversial pages. Given the set P of Wikipedia® controversial pages, sections S of the pages are identified as sections which are likely to describe controversial aspects of an entity described in the page. In one embodiment, sections S are identified by selecting sections of the page that have, in the title and/or in the text, one or more specified controversial words. For each word w appearing in any of the sections S, a controversy coefficient is estimated as the frequency of the word in the section divided by the frequency of the word in the page. Resulting top-ranked terms are included in the controversy lexicon.

In another embodiment, the controversy score for a snapshot accounts for a number of bad words that are used in the snapshot. In one embodiment, a bad words lexicon that includes a set of bad words is maintained based on a dictionary of bad words. As used herein, the dictionary of bad words may include, but is not limited to, profane, offensive, vulgar, or sexual words or phrases. The dictionary of bad words for a language may include words or phrases that exhibit poor spelling or grammar according to commonly known standards for the language.

Other features that may contribute to the controversy score include, but are not limited to: linguistic features including nouns, verbs, keywords, and/or questions in the content items; structural features including hashtags in the content items, whether content items are replies or copies of other content items, and information about users or entities that are associated with the content items; buzziness features including the relative frequency that an entity is mentioned in a given time window versus other time windows; sentiment including positive, negative, or neutral terms in the content items; controversy including frequency of positive and negative content items, frequency of controversy-indicative hashtags; news buzz features including the number of articles from other sources related to the same entity and generated during the same time window as the content items; and any other features relevant to whether content items reflect controversies, such as features that can be gleaned from content in the content items, from information about the author who submitted the content items, and/or from information in other sources related to the same entity and generated during the same time window as the content items. The controversy score may also account for other example features that are provided in Table 2.

Features of a snapshot over a given time period may be compared to or provided relative to features of other snapshots for the same entity in other time periods. For example, a controversy score may be higher or lower if there is a polarity of sentiment for the snapshot is greater or lesser than average for snapshots associated with the same entity.

In one embodiment, the controversy score is based on a number of items in the set that contain a verb for which the entity is a subject and/or an object. The process includes determining the number of items that contain a verb for which the entity is a subject and/or an object. In one example, a dictionary of verbs is used to detect verbs in the content items. A grammatical structure of the content item, as well as a tense of the verb, may be used to determine whether a reference to an entity is a subject or an object of the verb.

In the example from Table 1, content items referring to Barack Obama are categorized as controversial events, and one set of content items referring to Sigourney Weaver is categorized as a non-controversial event.

In one embodiment, a machine-learning model is trained on content items to determine a controversy score that is used to categorize snapshots as controversial or non-controversial. In one embodiment, a supervised learning or semi-supervised learning model uses snapshots that have been labeled as either controversial or non-controversial to determine whether other snapshots are controversial or non-controversial. The techniques described herein are not limited with respect to the type of machine-learning mechanism that is used to learn how the input features affect the degree to which a snapshot is likely to reflect a controversy associated with an entity. In one embodiment, the machine-learning model assigns weights to features that reflect the degree to which the features affect how likely a snapshot of items is to reflect a controversy.

In one embodiment, the controversy machine-learning model outputs a controversy score, and the controversy score is used to filter out non-controversies. In another embodiment, the controversy score is used as an input to an event learning model. In yet another embodiment, the controversy machine-learning model is part of a controversial event machine-learning model, and the controversial event machine-learning model outputs a controversial event score that indicates a degree to which the snapshots of content items are likely to reflect controversial events.

In one embodiment, whether or not machine-learning is used, controversies are detected using a specified function that computes a controversy score based on input features.

Controversial Event Detection

A controversial event is an event that is likely to be controversial among authors or viewers of content about the event. The event detection and controversy detection steps may be performed separately or grouped together into one controversial event detection step. If performed separately, the event detection step may be used to filter out non-events before the controversy detection step is performed. Alternately, the controversy detection step may be used to filter out non-controversies before the event detection step is performed. Both steps are completed to filter out snapshots that are not controversial events, leaving a set of snapshots that reflect controversial events. In yet another embodiment, the event detection and controversy detection steps are combined into a single controversial event detection step. In another embodiment, one or both of the steps are used as an input to a controversial event detection step that computes a controversial event score that indicates a degree to which the snapshot is likely to reflect a controversial event. A controversial event detection score may account for any of the features discussed with respect to either the controversy score or the event score, or any other feature that is indicative of whether a snapshot of content items reflects a controversial event about an entity.

Table 2 shows example controversial events that were determined for various entities at various times. Displaying content associated with those entities near the date of the controversial event would peak the interest of viewers and promote a public discussion of the controversial event.

TABLE 2

| Entity | Date | Example Controversial Event |
|---|---|---|
| Barack Obama | Sep. 10, 2009 | President Obama is awarded the Nobel Peace Prize |
| Harry Reid | Nov. 18, 2009 | Majority leader Harry Reid unveils Senate version of the Healthcare Bill |
| Sarah Brown | Jan. 20, 2010 | Sarah Brown, wife of British Prime Minister Gordon Brown is heckled at the National Television Awards |
| David Copperfield | Jan. 13, 2010 | Rape charges against David Copperfield are dropped |

In one embodiment, a machine-learning model is trained on content items to determine a controversial event score that is used to categorize snapshots as controversial events or not controversial events. In one embodiment, a supervised learning or semi-supervised learning model uses snapshots that have been labeled as either controversial events to determine whether other snapshots are controversial or non-controversial. The techniques described herein are not limited with respect to the type of machine-learning mechanism that is used to learn how the input features affect the degree to which a snapshot is likely to reflect a controversial event associated with an entity. In one embodiment, the machine-learning model assigns weights to features that reflect the degree to which the features affect how likely a snapshot of items is to reflect a controversial event.

In one embodiment, whether or not machine-learning is used, controversial events are detected using a specified function that computes a controversial event score based on input features.

Example Features

Various features may be used as input to the event determination model, the controversy determination model, and/or the controversial event determination model. The techniques described herein are not limited with respect to the features that can be used for each of these models. Any feature relevant to event determination, controversy determination, and/or controversial event determination may serve as an input to one of the models. A non-limiting set of example features is provided below in Table 3, where the content items are tweets, or status updates in Twitter®.

TABLE 3

| Family | Type | Features |
|---|---|---|
| | | Twitter-based features |
| Linguistic | TW-LING-NOU | Percentage of words that are nouns |
| | TW-LING-VRB | Percentage of words that are verbs. |
| | TW-LING-BAD | Percentage of words that are bad words |
| | TW-LING-QST | Percentage of tweets containing at least one question. |
| | TW-LING-LEV | Average Levenshtein distance between tweets. |

TABLE 3-continued

| Family | Type | Features |
|---|---|---|
| | TW-LING-ENG | Percentage of words which match any word in the English dictionary. |
| | TW-LING-ENT-OC | Average number of mentions of the target entity across all tweets. |
| | TW-LING-ENT-VB | Percentage of verbs whose corresponding subject is the target entity. |
| | TW-LING-ENT-TW | Percentage of tweets containing at least one verb whose subject is the target entity. |
| Structural | TW-STRC-TOK | Number of tokens in the snapshot. |
| | TW-STRC-TWE | Number of tweets in the snapshot. |
| | TW-STRC-RET | Percentage of tweets that are retweets. |
| | TW-STRC-REP | Percentage of tweets that are replies. |
| | TW-STRC-USR | Average number of tweets per user. |
| | TW-STRC-TIM | Two features, representing mean and std.dev. of the distribution modeling tweets'timestamps. |
| | TW-STRC-HST | Number of unique hashtags with respect to the total number of hashtags. |
| Buzziness | TW-BUZZ | Number of tweets in snapshot referring to entity divided by average number of tweets in other snapshots referring to same entity |
| Sentiment | TW-SENT-POS | Fraction of positive tweets |
| | TW-SENT-NEG | Fraction of negative tweets |
| | TW-SENT-NEU | Fraction of neutral tweets |
| Controversy | TW-CONT-MIX | Mix of positive and negative tweets, for example: (minimum of fraction of positive versus negative or negative versus positive) multiplied by the number of positive and negative tweets divided by the number of positive, negative, and neutral tweets |
| | TW-CONT-TSY | Contradiction score, for example: $(\theta * \sigma^2) / (\theta + \mu^2)$ where $\mu$ and $\sigma^2$ are respectively the mean and the variance of the polarity scores of the tweets $\theta$ is a constant, $5*10^{-4}$, and W is a weight function that compensates for the varying number of post. For example, $W = (1 + \exp(A - n/B)$, where $A = 30$ and $B = 10$ |
| | TW-CONT-HST | Fraction of the total number of hashtags in the snapshot, of the following hashtags: '#controv', '#scandal', '#unheard' and '#wft'. |
| | TW-CONT-TRM | Percentage of tweets with least one controversy word from controversy lexicon. |

External features

| Family | Type | Features |
|---|---|---|
| News buzz | EX-BUZZ-1 | Number of articles aligned with the given snapshot. |
| | EX-BUZZ-2 | Change in the amount of news coverage for the given entity with respect to the recent past, for example: The number of articles about an entity in a time window minus the average number of articles about the entity in other time windows, divided by the number of articles about the entity in the time window. |
| Web-News Controversy | EX-CONT-HIST | Controversy level of an entity in Web data, for example: k/|controversyLexicon|, where k is the number of terms in the controversy lexicon, whose co-occurrence pointwise mutual information with the target entity on the Web, is above 2; and |controversyLexicon| is the size of the controversy lexicon. |
| | EX-CONT-ASS-1 | Sum of overall controversy scores for the entities co-ocurring with the target entity in the aligned news article set. |
| | EX-CONT-ASS-2 | Average of overall controversy scores for the entities co-ocurring with the target entity in the aligned news article set. |
| | EX-CONT-TRM-1 | Average number of controversy terms per news article (over all articles aligned with the snapshot) |
| | EX-CONT-TRM-2 | Max number of controversy terms per news article (over all articles aligned with the snapshot). |
| | EX-CONT-TRM-3 | Number of articles aligned with the snapshot that contain controversy terms. |

Example Direct Approach

In a direct approach, a controversial event detection model is trained to determine a degree to which a snapshot of content items is likely to reflect a controversial event associated with one or more entities. The controversial event detection model accounts for factors that affect a degree or likelihood that the snapshot reflects an event and factors that affect a degree or likelihood that the snapshot is controversial.

FIG. 1 illustrates an example system for controversial event detection from a set of content items. A set of content items 104 of content items 102 is selected for controversial event detection. In one example, selected set of content items 104 is associated with a current or recent time period. For example, the controversial event detection system may detect controversial events for content items that were posted within the past day. A set of entities 108 is selected for controversial event detection from entities 106. Selected set of entities 108 may be celebrities or entities which are frequently discussed or likely to be associated with controversial events.

Snapshot determination module 110 determines snapshots of content items that refer to entities 112. The snapshots 112 refer to entities from selected set of entities 108. In one embodiment, each snapshot of content items is associated with an entity and a window of time. From snapshots 112, controversial event determination module 114 determines snapshots of content items that represent controversial events 116. For example, controversial event determination module 114 may use a machine-learning model trained on one or more features to determine which snapshots represent controversial events. In one embodiment, controversial event determination module outputs a controversial event score for each snapshot 112, and the controversial event score is used to determine snapshots of content items that represent controversial events 116.

Figure 4:
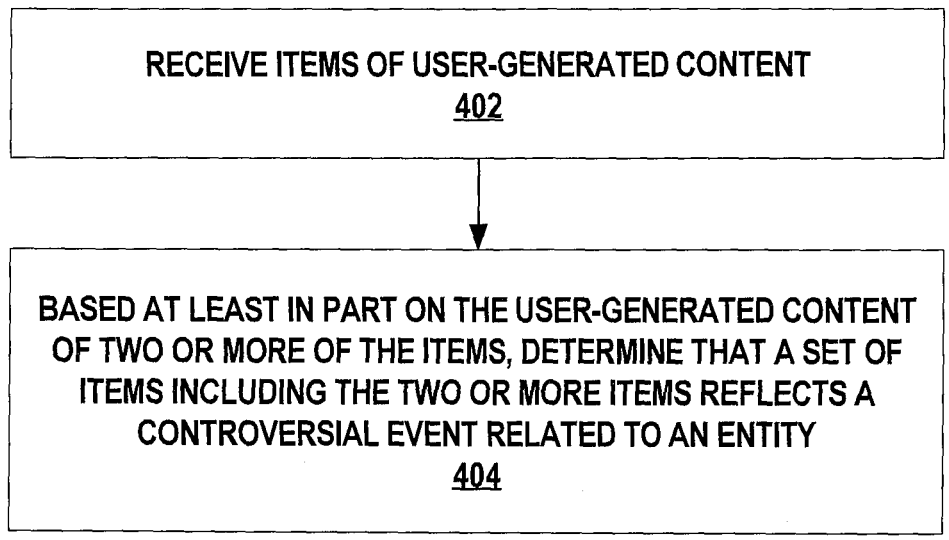
FIG. 4 is a diagram illustrating an example process performed by one or more computing devices for detecting controversial events from a set of content items.

FIG. 4 illustrates an example process performed by one or more computing devices for detecting controversial events from a set of content items. In step 402, one or more computing devices running one or more processes receive items of user generated content. In step 404, the one or more processes running on the machine determine that a set of items including two or more items reflects a controversial event related to an entity based at least in part on the user-generated content of the two or more items. For example, the content of a snapshot of two or more items may be matched to features on which a controversial event determination module is trained.

Example Pipeline Approach

In a pipeline approach, an event determination model is trained to determine a degree to which a snapshot of content items is likely to reflect an event associated with one or more entities, and a controversy determination model is trained based on a degree to which a snapshot of content items is likely to be controversial. Non-event snapshots are filtered out by the event determination module, and non-controversial snapshots are filtered out by the controversy determination module.

Figure 2:
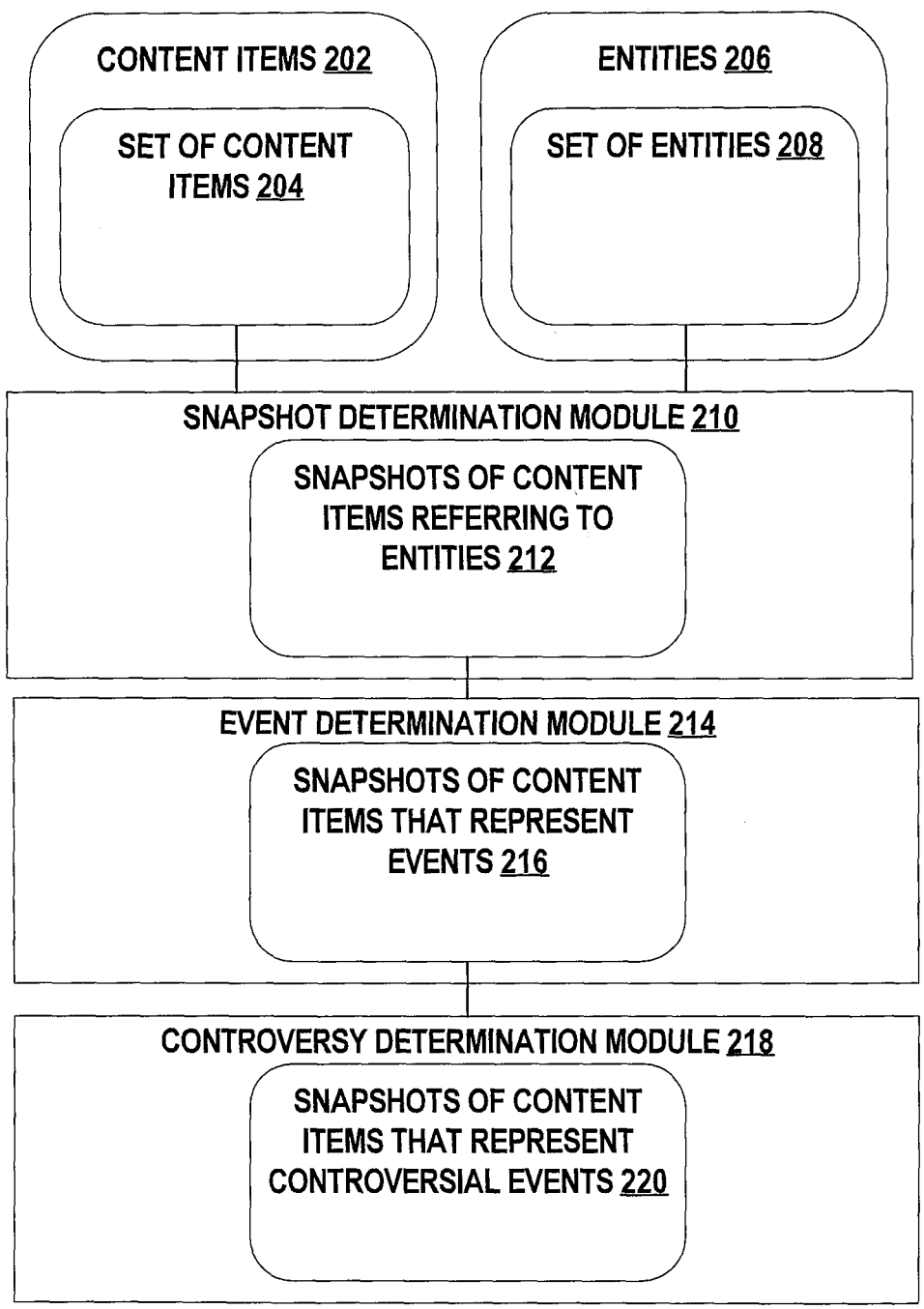
FIG. 2 is a diagram illustrating an example system for detecting events from a set of content items and determining whether the events are controversial.

FIG. 2 illustrates an example system for detecting events from a set of content items and determining whether the events are controversial. Snapshot determination module 210 determines snapshots of content items referring to entities 212. Event determination module 214 determines an event score that indicates snapshots of content items that represent events 216. Event determination module 214 may use the event score to filter out non-events to form snapshots 216. Controversy determination module 218 determines a controversy score that indicates snapshots of content items that represent controversial events 220. Controversy determination module 218 may use the controversy score to filter out non-controversial events to form snapshots 220.

Figure 5:
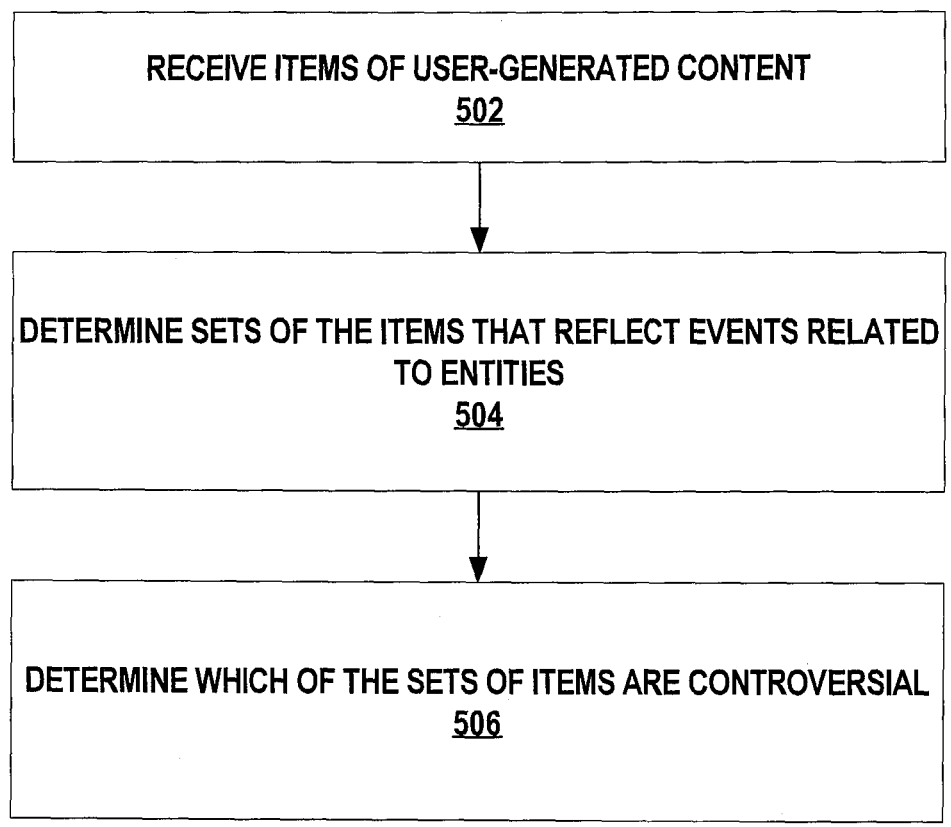
FIG. 5 is a diagram illustrating an example process performed by one or more computing devices for detecting events from a set of content items and determining whether the events are controversial.

FIG. 5 illustrates an example process performed by one or more computing devices for detecting events from a set of content items and determining whether the events are controversial. In step 502, one or more processes running on one or more computing devices receive items of user-generated content such as snapshots of items associated with entities. The one or more processes determine sets of items that reflect events related to entities in step 504. In step 506, the one or more processes determine which of the sets of items that reflect events are controversial.

Example Blended Approach

In a blended approach, an event determination model is trained to determine a degree to which a snapshot of content items is likely to reflect an event associated with one or more entities, and a controversial event determination model is trained to determine a degree to which a snapshot of content items is likely to reflect a controversial event. The controversial event determination model is trained based on the output of the event determination model. Event scores outputted by the event determination model are used as one feature that is inputted into the controversial event determination model. Unlike the pipeline approach, snapshots that are not likely to reflect events in the first step are not removed from consideration until the second step determines that the non-event snapshots are also not likely to reflect controversial events.

Figure 3:
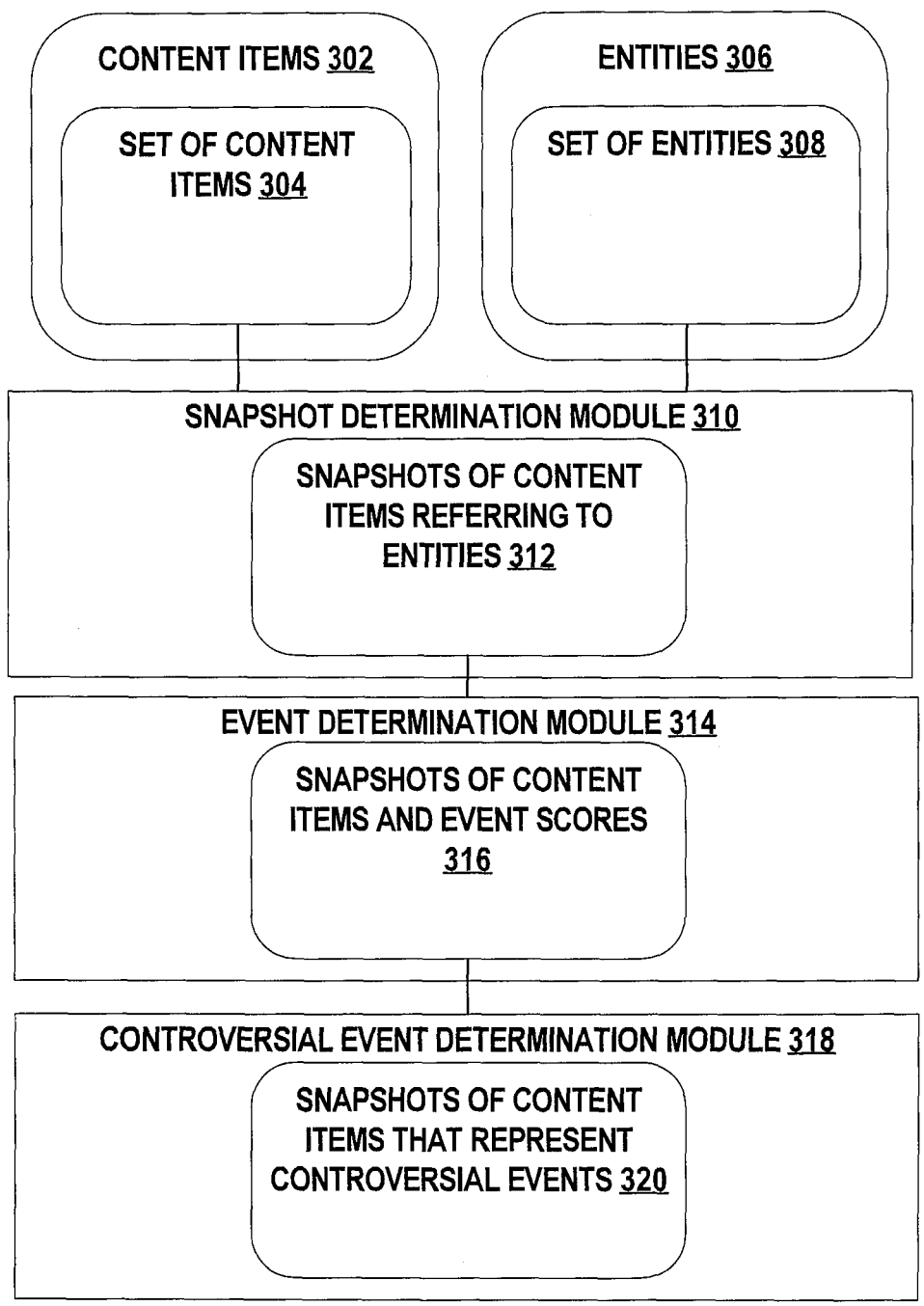
FIG. 3 is a diagram illustrating an example system for detecting controversial events from a set of content items in a manner that accounts for an event score indicating a degree to which the snapshots of items represent events.

FIG. 3 illustrates an example system for detecting controversial events from a set of content items in a manner that accounts for an event score indicating a degree to which the snapshots of items represent events. Snapshot determination module 310 determines snapshots of content items referring to entities 312. Event determination module 314 determines snapshots of content items and event scores 316 associated with the snapshots of content items. Based at least in part on event scores 316, controversial event determination module 318 determines snapshots of content items that reflect controversial events. In one example, controversial event determination module determines a controversial event score and selects items that reflect controversial events based on the controversial event score.

Figure 6:
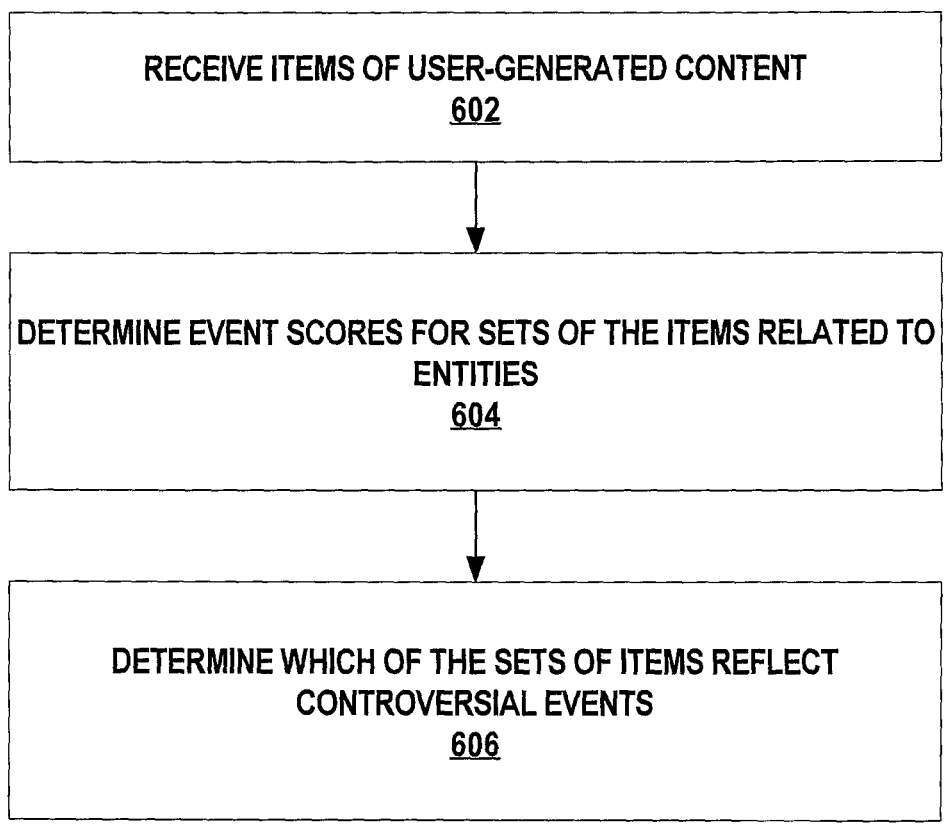
FIG. 6 is a diagram illustrating an example process performed by one or more computing devices for detecting controversial events from a set of content items in a manner that accounts for an event score indicating a degree to which the snapshots of items represent events.

FIG. 6 illustrates an example process performed by one or more computing devices for detecting controversial events from a set of content items in a manner that accounts for an event score indicating a degree to which the snapshots of items represent events. In step 602, one or more processes running on one or more computing devices receive items of user-generated content 602. In step 604, the one or more processes determine event scores for sets of the items related to entities. In step 606, the event scores are used by the one or more processes to determine which of the sets of items reflect controversial events.

Filtering Out Content Items

In one embodiment, content items are filtered from the set of content items, from any of the corpus of content items, from the snapshots of content items associated with entities, from event snapshots, and/or from sets of content items that reflect controversial events. In one example, content items that do not match a specified language, such as English, are filtered from the set of content items. In another example, content items that are repetitive are filtered from the set of content items. Filtering out repetitive items may prevent users from artificially creating controversial events by spamming large volumes of similar content items. In yet another example, items from a set of users are filtered from the set of content items. Items from users known to spam large amounts of content may be removed from the set of content items. Another example of filtering includes filtering out sets of items that include fewer than a threshold number of content items. Sets of items including fewer than 10 items, for example, might not be useful for detecting significant controversial events.

Displaying Content Items that Reflect Controversial Events

In one embodiment, content items that reflect controversial events are displayed along with information about entities associated with the content items. For example, information about a celebrity may be concurrently displayed with content items that reflect controversial events involving the celebrity. In another example, a set of positive content items and a set of negative content items are displayed concurrently with information about the entity.

In yet another example, a server may make a determination about the public perception of an event based on the relative occurrences of positive content items and negative content items. In response to determining that a majority of content items about the event are negative, the negative content items may be highlighted or displayed more prominently, or only negative content items may be displayed. In this manner, the server may curry to the favor of the public on controversial events in which members of the public are likely to have a strong opinion.

In one embodiment, a server displays a timeline of multiple events that are associated with an entity. The events might include only controversial events, or the events might include both controversial and non-controversial events. In a particular embodiment, controversial events on the timeline are highlighted or displayed more prominently than non-controversial events. In one embodiment, content items about the controversial events may be displayed concurrently with the timeline. Content items reflecting controversial events may be highlighted or displayed more prominently than content items reflecting non-controversial events. In another embodiment, content items may be selected for display based on the controversial event score for the content item. The server might select to display only items with high controversial event scores.

In another embodiment, one or more entities associated with controversial events are selected for display on a Web site. For example, entities associated with the highest controversial event scores for the most recent time windows may be displayed on a Web site that provides the latest controversial news about entities. Information about the entity may be displayed and optionally supplemented with recent content items about the entity.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
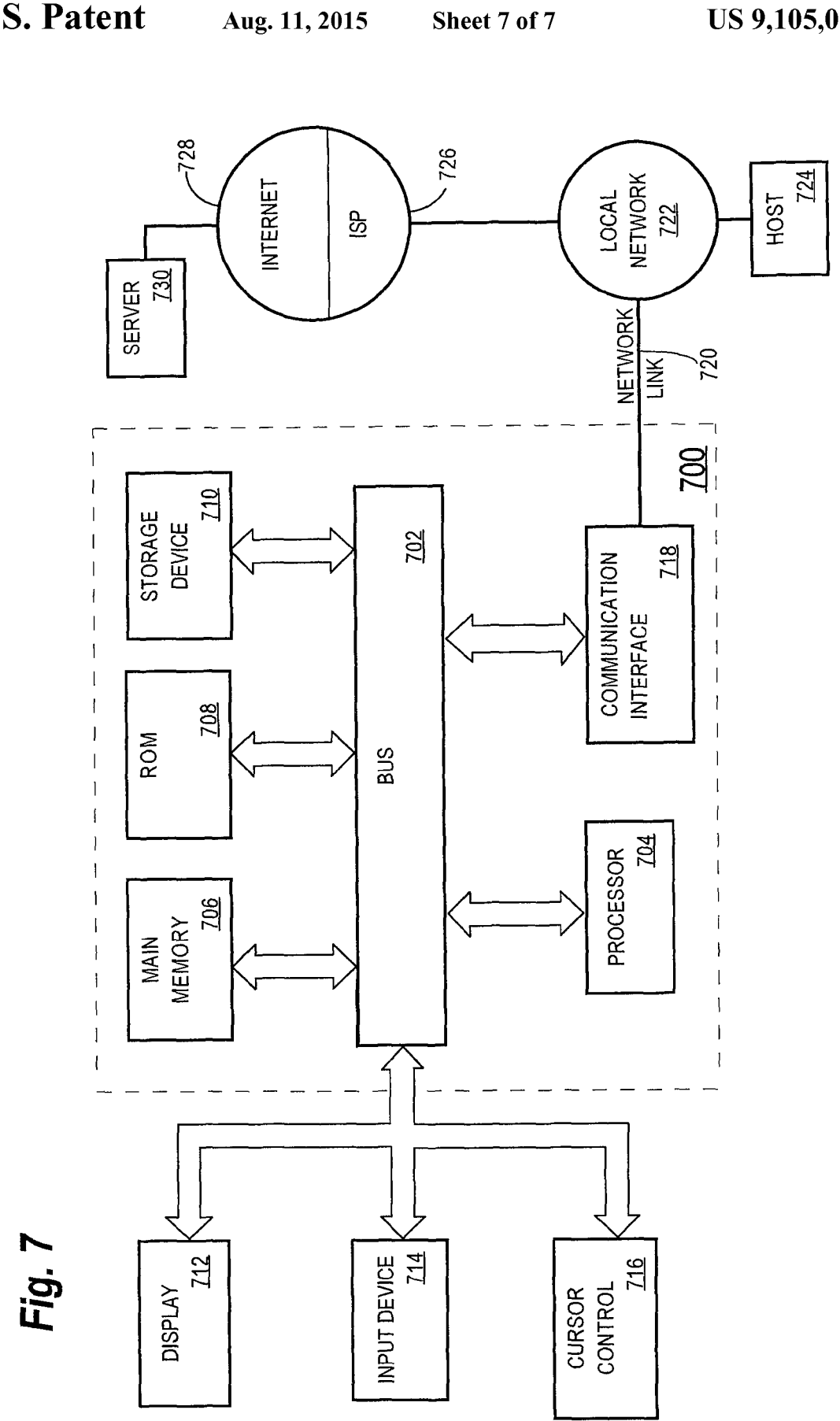
FIG. 7 is a diagram that illustrates an example computer system upon which an embodiment described herein may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a plurality of user-generated content items;
   wherein the plurality of user-generated content items comprises:
      user-generated content items that reflect one or more non-controversial events, and
      user-generated content items that reflect one or more controversial events that are likely to provoke disagreement or uneasiness among viewers;
   determining that a subset of user-generated content items, of the plurality of user-generated content items, reflect a controversial event based, at least in part, on
      determining that a particular entity is referenced in the user-generated content of each user-generated content item in the subset of user-generated content items,
      determining that each user-generated content item in the subset of user-generated content items was received within a same window of time, and
      determining, based on an analysis of the user-generated content of each user-generated content item in the subset of user-generated content items, that the particular entity has provoked disagreement or uneasiness among viewers of the user-generated content; and
   storing data that defines the controversial event, wherein the data that defines the controversial event includes data that identifies the particular entity and the window of time;
   wherein the method is performed by one or more computing devices.

2. The method of claim 1, wherein the plurality of user-generated content items comprise public posts by users of a social networking service, and wherein determining that each item in the subset of user-generated content items relates to the particular entity comprises determining that the particular entity is referenced using one or more terms in the subset of user-generated content items.

3. The method of claim 1, wherein the subset of user-generated content items comprises items that refer to the particular entity and were generated during the window of time, further comprising determining a number of references to the particular entity in the subset, and wherein determining that the subset reflects the controversial event is based at least in part on the number of references to the particular entity in the subset and an expected number of references to the particular entity in the subset, wherein the expected number of references to the particular entity accounts for subsets of user-generated content items that refer to the particular entity and were generated during other windows of time.

4. The method of claim 1, wherein the subset of user-generated content items comprises items that refer to the particular entity and were generated during the window of time, further comprising:
   determining a number of references to the particular entity by other content sources during the window of time;
   wherein determining that the subset reflects the controversial event is further based at least in part on the number of references to the particular entity by other content sources during the window of time and an expected number of references to the particular entity by the other content sources during the window of time;
   wherein the expected number of references accounts for references to the particular entity by the other content sources during other windows of time;

wherein the plurality of user-generated content items comprise posts that are less than 160 characters in length by users of a social networking service, and wherein the references to the particular entity by other content sources during the window of time and during the other windows of time comprise references in articles that are more than 160 characters in length from a reporting service that reports a plurality of articles.

5. The method of claim 1, further comprising:
determining that one or more items in the subset of user-generated content items also refer to one or more other entities;
determining a controversy score for the one or more other entities; and
wherein determining that the subset reflects the controversial event is based at least in part on the controversy score for the one or more other entities.

6. The method of claim 1, further comprising determining a number of items that include controversial terms in the subset, and wherein determining that the subset reflects the controversial event is further based at least in part on the number of controversial terms in the subset.

7. The method of claim 1, further comprising determining a first number of items in the subset that have a positive sentiment and a second number of items in the subset that have a negative sentiment, and wherein determining that the subset of user-generated content items reflects the controversial event is further based at least in part on the first number of items in the subset that have a positive sentiment and the second number of items in the subset that have a negative sentiment.

8. The method of claim 1, further comprising determining a number of items that contain at least one question in the subset, and wherein determining that the subset of user-generated content items reflects the controversial event is further based at least in part on the number of items that contain at least one question in the subset.

9. The method of claim 1, further comprising determining a number of unique marked tags in the subset, and wherein determining that the subset of user-generated content items reflects the controversial event is further based at least in part on the number of unique marked tags in the subset.

10. The method of claim 1, further comprising determining a number of items in the subset that contain a verb for which the particular entity is a subject or an object, and wherein determining that the subset of user-generated content items reflects the controversial event is further based at least in part on the number of items in the subset that contain a verb for which the particular entity is a subject or an object.

11. The method of claim 1, wherein analyzing content of each item in the subset of user-generated content items to determine whether the particular entity is involved a controversial event comprises:
determining that one or more items in the subset of user-generated content items reflects a positive sentiment, and
determining that one or more items in the subset of user-generated content items reflects a negative sentiment.

12. The method of claim 1, wherein analyzing content of each item in the subset of user-generated content items to determine whether the particular entity is involved a controversial event comprises determining that the subset of user-generated content items have more keywords that are likely to reflect controversy than items, of the plurality of user-generated content items, that are associated with other events of the plurality of events.

13. One or more non-transitory storage media storing instructions which, when executed by one or more computing devices, cause performance of:
receiving a plurality of user-generated content items;
wherein the plurality of user-generated content items comprises:
user-generated content items that reflect one or more non-controversial events, and
user-generated content items that reflect one or more controversial events that are likely to provoke disagreement or uneasiness among viewers;
determining that a subset of user-generated content items, of the plurality of user-generated content items, reflect a controversial event based, at least in part, on
determining that a particular entity is referenced in the user-generated content of each user-generated content item in the subset of user-generated content items,
determining that each user-generated content item in the subset of user-generated content items was received within a same window of time, and
determining, based on an analysis of the user-generated content of each user-generated content item in the subset of user-generated content items, that the particular entity has provoked disagreement or uneasiness among viewers of the user-generated content; and
storing data that defines the controversial event, wherein the data that defines the controversial event includes data that identifies the particular entity and the window of time.

14. One or more non-transitory storage media as recited in claim 13, wherein the plurality of user-generated content items comprise public posts by users of a social networking service, and wherein determining that each item in the subset of user-generated content items relates to the particular entity comprises determining that the particular entity is referenced using one or more terms in the subset of user-generated content items.

15. One or more non-transitory storage media as recited in claim 13, wherein the subset of user-generated content items comprises items that refer to the particular entity and were generated during the window of time, wherein the instructions, when executed by the one or more computing devices, further cause performance of:
determining a number of references to the particular entity in the subset;
wherein determining that the subset reflects the controversial event is based at least in part on the number of references to the particular entity in the subset and an expected number of references to the particular entity in the subset;
wherein the expected number of references to the particular entity accounts for subsets of items that refer to the particular entity and were generated during other windows of time.

16. One or more non-transitory storage media as recited in claim 13, wherein the subset of user-generated content items comprises items that refer to the particular entity and were generated during the window of time, wherein the instructions, when executed by the one or more computing devices, further cause performance of:
determining a number of references to the particular entity by other content sources during the window of time;
wherein determining that the subset reflects the controversial event is further based at least in part on the number of references to the particular entity by other content sources during the window of time and an expected number of references to the particular entity by the other content sources during the window of time;

wherein the expected number of references accounts for references to the particular entity by the other content sources during other windows of time;

wherein the plurality of user-generated content items of user-generated content comprise posts that are less than 160 characters in length by users of a social networking service, and wherein the references to the particular entity by other content sources during the window of time and during the other windows of time comprise references in articles that are more than 160 characters in length from a reporting service that reports a plurality of articles.

17. One or more non-transitory storage media as recited in claim 13, wherein the instructions, when executed by the one or more computing devices, further cause performance of:
   determining that one or more items in the subset of user-generated content items also refer to one or more other entities;
   determining a controversy score for the one or more other entities; and
   wherein determining that the subset reflects the controversial event is based at least in part on the controversy score for the one or more other entities.

18. One or more non-transitory storage media as recited in claim 13, wherein the instructions, when executed by the one or more computing devices, further cause performance of:
   determining a number of items that include controversial terms in the subset, and wherein determining that the subset reflects the controversial event is further based at least in part on the number of controversial terms in the subset.

19. One or more non-transitory storage media as recited in claim 13, wherein the instructions, when executed by the one or more computing devices, further cause performance of:
   determining a first number of items in the subset that have a positive sentiment and a second number of items in the subset that have a negative sentiment, and wherein determining that the subset of user-generated content items reflects the controversial event is further based at least in part on the first number of items in the subset that have a positive sentiment and the second number of items in the subset that have a negative sentiment.

20. One or more non-transitory storage media as recited in claim 13, wherein the instructions, when executed by the one or more computing devices, further cause performance of:
   determining a number of items that contain at least one question in the subset, and wherein determining that the subset of user-generated content items reflects the controversial event is further based at least in part on the number of items that contain at least one question in the subset.

21. One or more non-transitory storage media as recited in claim 13, wherein the instructions, when executed by the one or more computing devices, further cause performance of:
   determining a number of unique marked tags in the subset, and wherein determining that the subset of user-generated content items reflects the controversial event is further based at least in part on the number of unique marked tags in the subset.

22. One or more non-transitory storage media as recited in claim 13, wherein the instructions, when executed by the one or more computing devices, further cause performance of:
   determining a number of items in the subset that contain a verb for which the particular entity is a subject or an object, and wherein determining that the subset of user-generated content items reflects the controversial event is further based at least in part on the number of items in the subset that contain a verb for which the particular entity is a subject or an object.

23. One or more non-transitory storage media as recited in claim 13, wherein the instructions, when executed, cause analyzing content of each item in the subset of user-generated content items to determine whether the particular entity is involved a controversial event at least in part by:
   determining that one or more items in the subset of user-generated content items reflects a positive sentiment, and
   determining that one or more items in the subset of user-generated content items reflects a negative sentiment.

24. One or more non-transitory storage media as recited in claim 13, wherein the instructions, when executed, cause analyzing content of each item in the subset of user-generated content items to determine whether the particular entity is involved a controversial event at least in part by determining that the subset of user-generated content items have more keywords that are likely to reflect controversy than items, of the plurality of user-generated content items, that are associated with other events of the plurality of events.

* * * * *